United States Patent [19]

Irwin

[11] 3,922,851
[45] Dec. 2, 1975

[54] COMBUSTOR LINER SUPPORT
[75] Inventor: John A. Irwin, Indianapolis, Ind.
[73] Assignee: General Motors Corporation, Detroit, Mich.
[22] Filed: Apr. 5, 1974
[21] Appl. No.: 458,074

[52] U.S. Cl. ........... 60/39.32; 60/39.65; 60/39.82 R
[51] Int. Cl.² ........................ F02C 7/20; F02C 7/00
[58] Field of Search ............ 60/39.31, 39.32, 39.65, 60/39.69; 415/214; 431/352, DIG. 12

[56] References Cited
UNITED STATES PATENTS

| | | | |
|---|---|---|---|
| 1,960,810 | 5/1934 | Gordon | 415/214 |
| 2,654,219 | 10/1953 | Zaba | 431/352 |
| 2,674,846 | 4/1954 | Bloomer et al. | 60/39.65 |
| 2,686,655 | 8/1954 | Schorner | 415/214 |
| 2,725,929 | 12/1955 | Massion | 60/39.65 |
| 3,594,109 | 7/1971 | Penny | 60/39.65 |
| 3,777,484 | 12/1973 | Dibelius et al. | 60/39.65 |

FOREIGN PATENTS OR APPLICATIONS

| | | | |
|---|---|---|---|
| 691,430 | 5/1940 | Germany | 60/39.65 |

*Primary Examiner*—C. J. Husar
*Assistant Examiner*—L. J. Casaregola
*Attorney, Agent, or Firm*—Paul Fitzpatrick

[57] ABSTRACT

A combustor for a gas turbine engine embodies a ceramic liner the upstream or dome end of which has a central opening. The liner is supported from the combustion chamber housing by a ring defining an abutment which engages a flange on the outer surface of the liner adjacent the dome and by a ring, biased by a spring reacting against the housing, engaging the outer surface of the dome adjacent the opening.

3 Claims, 1 Drawing Figure

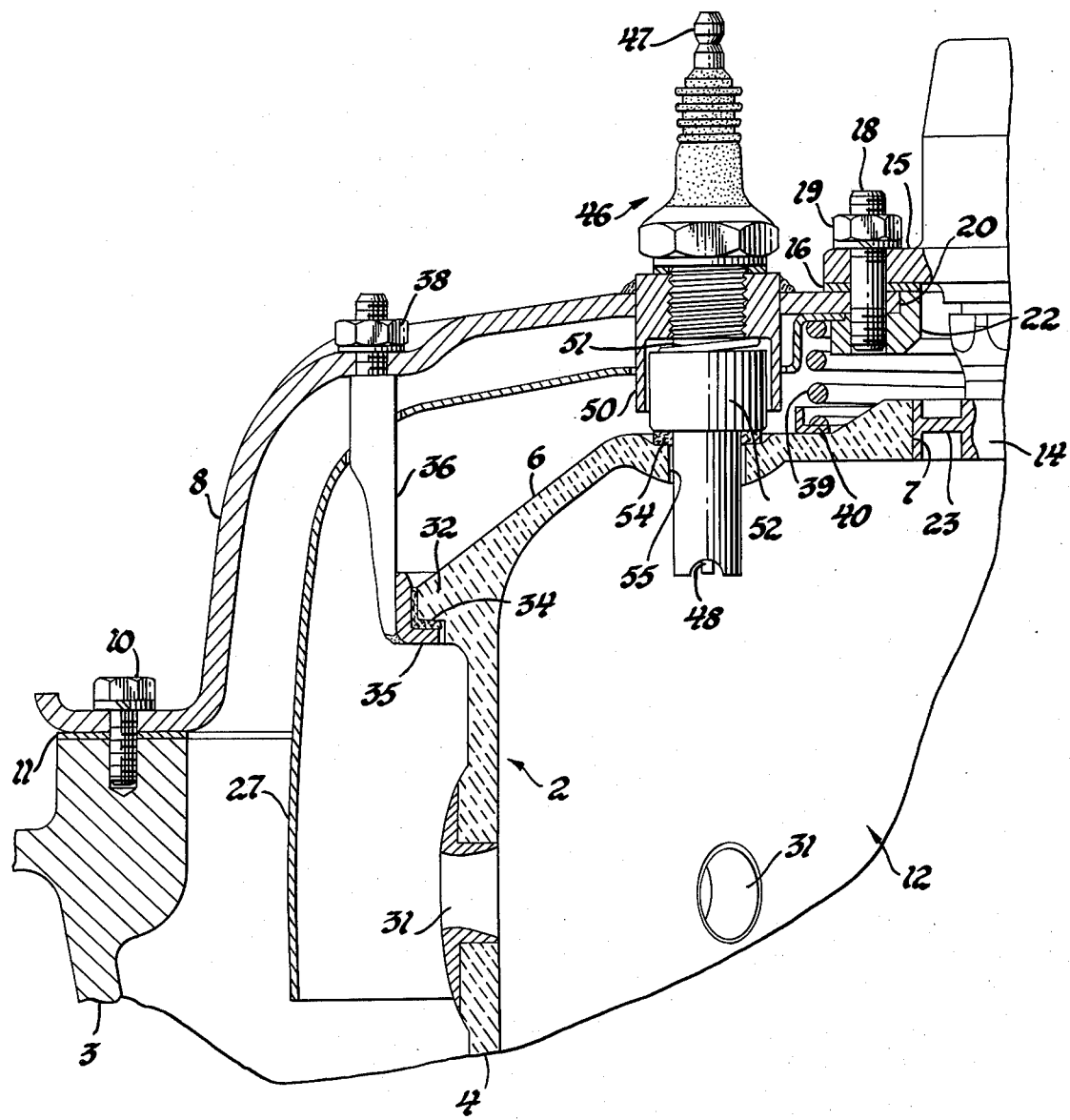

COMBUSTOR LINER SUPPORT

This invention is directed to combustion apparatus such as is used in a gas turbine engine, and particularly to combustion liner structure for such apparatus.

By way of background, most gas turbine combustion apparatuses include a liner within which combustion takes place. Such liners ordinarily are of circular or annular cross-section, with an upstream end called a dome and an outlet at the downstream end for combustion products. Fuel is sprayed at the upstream end and air enters through the upstream end and through the side wall of the liner to effect combustion and to dilute the combustion products to a suitable temperature.

Although walls of many combustion apparatuses have been made of various ceramic materials, practical gas turbine combustion liners, so far I am aware, have been made of high temperature resisting metal alloys. Such metal alloy structures have good hot strength and a relatively high degree of durability. However, such combustion liners are very expensive; therefore, if ceramics can be substituted for the metal to provide a satisfactory liner, considerable savings may result.

While various known ceramics are highly resistant to heat and may be formed into cylinders and other shapes by known techniques, such materials are relatively weak and brittle. Also, the ceramics have relatively low thermal expansion, which presents a problem when it becomes necessary to mount them with metal components in an engine combustion apparatus.

This invention is directed to a structure which facilitates the employment of ceramic elements for the major portion of a combustion liner so as to retain the cost and temperature resisting advantages of the ceramic while avoiding stresses on the ceramic material which would be likely to cause cracking or breaking.

Generally stated, in a combustion apparatus according to my invention, a ceramic combustion liner, preferably of one-piece construction, includes a side wall and an inwardly extending upstream end portion defining the dome of the combustion liner. The side wall has an exterior flange adjacent this dome portion, and this flange engages an abutment supported from the outer wall or housing of the combustion apparatus. The liner is biased resiliently against this abutment by spring means reacting against the housing and against the dome near its center. The liner is thus supported with sufficient rigidity but without danger of applying destructive forces to the liner due to vibration or to differential expansion of the parts.

The principal objects of my invention are to provide improved and more economical combustion liners for gas turbine engines, to provide improved means for mounting a ceramic combustion liner in gas turbine or other combustion apparatus; and to provide improved support for a ceramic combustion liner.

The nature of the invention and its advantages will be more clearly apparent to those skilled in the art from the succeeding detailed description of preferred embodiments of the invention and the accompanying drawings thereof.

The FIGURE is a partial sectional view illustrating the upstream end of a combustion apparatus, the view being taken on a plane containing the axis of the combustion liner.

The FIGURE illustrates a combustion liner as installed in a gas turbine engine of known type which may be similar to those described in U.S. Pats. as follows: Collman et al No. 3,077,074, Feb. 12, 1963; Collman et al No. 3,267,674, Aug. 23, 1966; and Bell No. 3,490,746, Jan. 20, 1970. The combustion liner 2 may be mounted in a suitable space within the engine, a portion of the frame or housing of the engine being designated as 3. The combustion liner illustrated is an integral ceramic structure of circular cross section including a generally cylindrical side wall 4 and a converging upstream end or dome portion 6. A circular opening 7 is located centrally in the dome portion. The downstream end of the liner (not illustrated) may discharge through suitable structure into a turbine, as is generally understood.

The liner is supported from a combustion chamber cover 8 forming part of the housing of the engine and of the combustion apparatus. The combustion chamber cover may be secured around its periphery by cap screws 10 and be sealed by a gasket 11. Fuel is sprayed into the combustion zone of the liner, indicated generally at 12, by a fuel spray nozzle 14 which includes a mounting flange 15 held against a gasket 16 by studs 18 extending through the cover 8 and bearing nuts 19. The fuel nozzle extends through an opening 20 in the cover which is closed by the flange 15. Studs 18, which may be three in number, extend from a ring 22 which surrounds the fuel nozzle 14 and is piloted in hole 20. An air swirler 23, which may be part of the fuel nozzle casting, is disposed between the fuel nozzle spray tip and the wall of hole 7.

The ring 22 includes a flange which engages the inner surface of an air baffle 27 disposed between the ring 22 and the inner side of the cover 8. The air baffle 27 serves to shield the cover 8 from heat radiating from hot parts of the engine and also serves somewhat to guide combustion air towards the liner. Such combustion air can flow in part through the air swirler 23. Additional combustion air is delivered into the combustion zone through ports 31 distributed around the liner. Additional air for dilution of the combustion products may enter farther downstream of the liner, as is well known and is not illustrated.

The liner 2 has an integral flange 32 on the outer surface of the liner adjacent the dome 6. This flange forms part of means to locate and support the liner. The lower surface and outer surface of the flange bears through a slightly yieldable ring 34 of heat-resistant material, such as a felt of ceramic or refractory metal fibers, against an L-section mounting ring 35 supported from the case.

As shown, a number of posts 36 distributed around the axis of the liner are welded to the mounting ring 35. These posts are fixed to the cover 8 by nuts 38.

The liner is held seated on the ring 35 by a biasing spring 39 which is seated in a recess in baffle 27 around ring 22. This spring bears against the liner dome 6 through a washer 40. The liner is thus properly located but undue force cannot be exerted on it, and relative axial expansion of the liner and its metal supporting structure are tolerated by compression of spring 39. As will be apparent, the spring provides secure location of the liner and couples it with sufficient rigidity to the support or abutment 22 while avoiding undue pressure or destructive crushing force on the liner because of the resilient nature of the structure. Also, the structure is tolerant of relative radial expansion of the metal and ceramic parts. Ordinarily, the mounting ring 35 will expand more than the liner. Posts 36 can yield to expansion of ring 35.

The figure also shows the installation of an igniter for the combustion apparatus. The igniter 46 includes a terminal or electrical input end 47 and a sparking electrode arrangement 48. The details of the igniter are immaterial to the invention. The igniter is threaded into a cup-shaped socket 50 extending through an opening in the cover 8 and welded in place. A cylindrical cavity in the socket 40 receives a coil compression spring 51. This spring bears against a generally cylindrical guide 52 which is slidable within the socket 50. The guide has an inturned flange against which the spring 51 bears and which bears in turn against a washer or gasket 54. The gasket bears against a flat exterior surface portion of the dome which surrounds a port 55 in the dome through which the igniter extends. The gasket is made of a suitable somewhat yielding heat resistant material such as a ceramic felt, for example. It prevents undesired air flow through the port 55 which could cause thermal stresses in the ceramic material by cooling the dome wall around port 47. The spring 51 can yield to accommodate expansion of the liner and prevent undue loading of the liner while restricting flow through the port 55.

It will be noted that spring 39 which acts to hold the liner in place is in position to be cooled by air flowing to the inlet air swirler of the combustion liner which is disposed around the fuel spray head.

It will be apparent to those skilled in the art from the foregoing description that the structure described provides for adequate support of the ceramic liner which is such as not to allow it to shake and rattle and yet is not so rigid as to cause danger of cracking or chipping of the liner.

The detailed description of the preferred embodiment of the invention for the purpose of explaining the principles thereof is not to be considered as limiting or restricting the invention, since many modifications may be made by the exercise of skill in the art.

I claim:

1. A combustion apparatus for a gas turbine engine having a housing including a wall; a combustion liner of ceramic material mounted within the housing and spaced from the housing to define a passage between the housing and liner for flow of combustion air into the liner, the liner having a side wall and a dome portion at the upstream end of the side wall both exposed to the said air flow; abutment means extending from the housing wall and abutment means on the exterior of the upstream end of the side wall adjacent the dome bearing against the first-recited abutment means; and resiliently-biased means reacting against the housing wall and bearing against the central portion of the dome portion to press the liner against the first-recited abutment means and support the liner from the wall with freedom for relative expansion of the liner and the liner supporting means including the abutment means and the resiliently-biased means.

2. A combustion apparatus for a gas turbine engine having a housing including a wall; a combustion liner of ceramic material mounted within the housing and spaced from the housing to define a passage between the housing and liner for flow of combustion air into the liner, the liner having a side wall and a converging wall portion at the upstream end of the side wall both exposed to the said air flow; abutment means mounted on posts extending from the housing wall and abutment means on the exterior of the side wall bearing against the first-recited abutment means; and resiliently-biased means reacting against the housing wall and bearing against the central portion of the converging wall portion to press the liner against the first-recited abutment means and support the liner from the wall with freedom for relative expansion of the liner and the liner supporting means including the abutment means and the resiliently-biased means.

3. A combustion apparatus for a gas turbine engine having a housing including a wall; a combustion liner of ceramic material mounted within the housing and spaced from the housing to define a passage between the housing and liner for flow of combustion air into the liner, the liner having a side wall and a converging wall portion at the upstream end of the side wall surrounding an opening for flow of air into the liner at the upstream end of the liner, the side wall and the converging wall portion being exposed to the said air flow; abutment means extending from the housing wall and abutment means on the exterior of the upstream end of the side wall bearing against the first-recited abutment means; resiliently-biased means in the path of air flow into the said opening reacting against the housing wall and bearing against the outer side of the wall portion around the opening to press the liner against the first-recited abutment means and support the liner from the wall with freedom for relative expansion of the liner and the liner supporting means including the abutment means and the resiliently-biased means; and fuel spraying means mounted on the housing wall adapted to introduce fuel through the said opening.

* * * * *